C. H. HAPGOOD.
INDICATING ATTACHMENT FOR COMPUTING SCALES.
APPLICATION FILED JAN. 12, 1918.

1,402,762.

Patented Jan. 10, 1922.

Inventor
Clarence H. Hapgood
By George R. Frye.
Attorney

Witnesses

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

INDICATING ATTACHMENT FOR COMPUTING SCALES.

1,402,762. Specification of Letters Patent. Patented Jan. 10, 1922.

Original application filed January 27, 1913, Serial No. 744,443. Divided and this application filed January 12, 1918. Serial No. 211,515.

*To all whom it may concern:*

Be it known that I, CLARENCE H. HAPGOOD, a citizen of the United States, residing at Toledo, in the county of Lucas and State of Ohio, have invented certain new and useful Improvements in Indicating Attachments for Computing Scales, of which the following is a specification.

This invention relates to indicating attachments for computing scales, and more particularly comprises a device for conveniently indicating the prices of various commodities in proximity to the computing chart.

Often it is found that a salesman or clerk reads the wrong indication on the computing chart because he is not certain of the price per pound of the commodity being weighed, and the result in the course of a day or week may mean a considerable loss to the proprietor or customers. With the use of my invention this difficulty can be overcome, as in case the salesman is forgetful or uninformed as to the prices of various commodities, and especially in the case of commodities whose prices fluctuate from day to day, the indicators showing the prices of the various commodities are suspended in their proper positions adjacent the several price columns of the computing chart, and thus form an efficient means of refreshing the memory of the salesman.

The invention herein claimed was first disclosed in my application for weighing scales, Ser. No. 744,443, filed January 27, 1913, now Patent No. 1,253,239, issued January 15, 1918, and this case is filed as a division thereof.

Reference is to be had to the accompanying drawings illustrating a preferred embodiment of my invention and wherein similar reference numerals designate similar parts throughout the several views.

In the drawings:—

Figure 1 is a side elevation of a computing scale equipped with my improvements;

Figure 2 is a front elevation of the upper portion thereof;

Figure 3 is an enlarged detail view of the indicator tags;

Figure 4 is an edge view thereof; and

Figure 5 is a detail sectional view showing one of the indicator slides in position upon the slide bar.

Referring more particularly to the drawings, the base 5 supports the housing 6 upon which rests the casing 7 containing the cylinder indicating mechanism 8 upon the periphery of which is mounted a chart bearing weight and value graduations in the usual manner of computing scales. The cylinder 8 is secured upon a shaft 9 which also carries a pinion 10 meshing with a rack 11 secured at its lower extremity to the scale beam 12. The scale beam is preferably a lever of the second order, and is supported adjacent its forward extremity upon standards 13 carried by the base 5, the platform 14 resting upon the scale beam intermediate its fulcrum and its point of connection with the weight-offsetting and indicating mechanisms. The weight-offsetting mechanism may consist of a pendulum or any other desired form of counterbalance mechanism, so arranged that when a commodity is placed upon the scale platform the counterbalance member will be swung to a position in which it will offset the weight of the commodity and the rack actuating the indicating mechanism will be moved to a position in which it will indicate this weight. A dash pot 15 or other suitable damping device is preferably employed to prevent undue oscillation of the scale beam and connected members.

As herein shown, the cylindrical chart 8 is arranged with parallel rows of price-indicating numerals, each of the rows indicating the values of various weights of commodities at a particular price per pound. The price per pound shown by each column is marked upon a member carried by the chart casing immediately below the horizontal sight opening on the salesman's side. To conveniently indicate which of these price columns are to be used in determining the value of the commodity then being weighed, I have arranged means whereby a plurality of commodity-indicating tags may be suspended adjacent any or all of the price columns. Immediately in front of and below this elongated sight opening I mount the horizontal rod 16 supported in ears 17 projecting from the casing and upon which rod a plurality of indicating slides 18 are free to be moved longitudinally of the rod to any desired position. Each of the indicator slides 18 preferably comprises arms arranged to conveniently fit over the bar 16 and an upwardly-projecting ear 19 upon which is mounted a pointer 20 which may be brought into register with any of the price indications upon the lower edge of the sight opening. When the desired position on the horizontal bar is reached the slide 18 is firmly clamped by means of a set screw 21 (see Figure 5). At its lower end one of the arms of the slide 18 is formed with an eye 22 for the reception of the hook 23 of a tag 24 bearing the name of any commodity which is designed to be sold with the aid of the scale. Each of the tags (which are best shown in Figure 3) is provided at its lower edge with an eye 25 into which may be inserted the hook of another tag so that any desired number of tags bearing the names of different commodities may be suspended from a single indicator slide. Obviously any number of these slides may be used up to the number of columns upon the chart and as many commodity-indicating tags suspended from each slide as is desired.

While it will be apparent that the illustrated embodiment of my invention herein disclosed is well calculated to adequately fulfill the objects primarily stated, it is to be understood that my invention is susceptible to variation, modification and change without departing from the spirit and scope of the invention as set forth in the subjoined claims.

Having described my invention, I claim:

1. In a computing scale and in combination with the price indicating member thereof having marked thereon a scale of prices per unit of weight; commodity indicating tags and means for rendering said tags adjustable along the scale of prices per unit of weight.

2. In a computing scale having a member provided with a scale of prices per unit of weight, a pointer, means whereby the pointer is rendered adjustable along said scale, and tags secured to the pointer and bearing the names of different commodities.

3. In a price computing scale having a member provided with a scale of prices per unit of weight, one or more slides, means whereby the slides are rendered adjustable along said scale of prices, and tags bearing the names of various commodities for the weighing of which the scale is to be used, detachably connected to said slides.

4. In a computing scale having a member provided with a scale of prices per unit of weight, a rod arranged parallel to the scale of prices per unit of weight, pointers adjustable along the rod and indicating on the scale, and one or more tags detachably connected to each pointer, the tags being so constructed that each one may be detachably connected to either end of any other one.

5. In a computing scale having a member provided with a scale of prices per unit of weight, a rod arranged parallel with said price scale, a slide mounted on the rod and having a pointer co-operating with the scale and a set screw for setting the slide to any desired position upon the rod, and a series of tags bearing the names of various commodities with which the scale is to be used and detachably connected to each other and to said slide.

6. In a computing scale having a member provided with a horizontal series of price per unit of weight numerals, a horizontal slide rod adjacent said numerals, one or more slides mounted on said rod and each having a set screw by which it is secured to the rod, and a pointer for co-operating with said series of numerals, and a series of tags detachably connected to said slides and bearing the names of various commodities for weighing which the scale is to be used.

7. In a price computing scale having a member provided with a scale of prices per unit of weight, adjustable pointers arranged to be set in registration with the prices in such scale, and commodity-indicating tags suspended from the pointers.

8. In a price computing scale having a member provided with a scale of prices per unit of weight, an adjustable pointer arranged to be set in registration with any of the prices in said scale, a commodity-indicating tag mounted upon the pointer, and means for suspending from said tag other commodity-indicating tags.

9. In a computing scale having a member provided with a scale of prices for unit of weight, a rod arranged parallel with said price scale, a slide adjustably mounted on the rod and comprising a pair of arms fitting over the rod, and an upwardly-extending pointer arranged to indicate any desired price in said scale.

CLARENCE H. HAPGOOD.

Witnesses:
CARL ZIUKE,
HORACE H. LYBRAND.